Oct. 5, 1954   C. J. FORD   2,691,134
LEAK DETECTOR

Filed Dec. 29, 1951                         2 Sheets-Sheet 1

INVENTOR.
CHARLES J. FORD
BY
ATTORNEY

Oct. 5, 1954

C. J. FORD 2,691,134

LEAK DETECTOR

Filed Dec. 29, 1951

INVENTOR.
CHARLES J. FORD

BY

*R. L. Miller*
ATTORNEY

Patented Oct. 5, 1954

2,691,134

UNITED STATES PATENT OFFICE 2,691,134

LEAK DETECTOR

Charles J. Ford, Akron, Ohio, assignor, by mesne assignments, to The Goodyear Tire & Rubber Company, a corporation of Ohio Application December 29, 1951, Serial No. 264,101

5 Claims. (Cl. 324—65)

This invention relates to a device for detecting the leakage of fluids from a container. More particularly, the device of the present invention is useful in detecting leakage of inflammable fluids such as gasoline, gasoline vapors and the like from storage receptacles, especially those disposed in closely confined compartments.

In many instances, it is very desirable and sometimes essential, that adequate provision be made to detect leakage of such fluids, particularly in airplanes, boats, military vehicles, etc. where highly volatile fuel is carried. The fuel-carrying systems of aircraft for example utilize all available space in the plane to provide the maximum fuel-carrying capacity. Many portions of the plane structure are not readily accessible for inspection and therefore it is practically impossible to determine if leakage is taking place.

Fuel-carrying containers for aircraft are usually tailored to fit a particular space by several methods, among which include either building a single container having flexible walls to fill the entire space or several individual containers that collectively fill the available space. Another method used in some instances is to form a number of open-end sections which are mechanically joined together to form a large single container. Irrespective of which type of container is used, there are certain areas where leakage is most likely to occur and it is in these areas that the leak-detector apparatus is installed.

Because, as previously indicated, many of the fuel-carrying containers are located in closely confined and enclosed portions of the plane, a serious explosion hazard may result if the leakage continues undetected. Due to the inaccessability of many portions of the containers, and the numerous places where such leakage may occur in such complex container construction, it is desirable that a permanent and positive means of detecting any leaks be provided. Preferably such a device should be one in which the leak detector can be positioned at the most likely places of leakage and the indicating means located at some convenient place for easy observation.

In many applications it is not necessary that the leak-detecting device be in constant operation but available for periodic use, such, for example, as when the airplane, vehicle or boat is being serviced or subjected to a routine check-up. The present invention is adaptable to any conventional type of installation, it being necessary only to provide the desired type of circuit to meet the specific requirements.

One object of the invention is to provide a device that is simple in operation and dependable.

Another object is to provide a device that is sufficiently sensitive so as to detect and indicate small leaks.

A further object of the invention is to provide a device that can be placed at the locations where leakage is most likely to occur but will operate indicating means at a readily accessible position.

Another object is to provide a device that may be used in conjunction with a variety of indicating means.

A particular object of the invention is to provide a device that functions completely independently of the vehicle on which it is mounted.

A still further object of this invention is to provide a device which is capable of being arranged advantageously in one or more groups in such fashion that each device functions independently of any adjacent thereto to determine the conditions present at each device. The devices are adapted to be included in a common circuit and checked individually at a common point, remote from the location of the device.

These and other objects will appear hereinafter as the description of certain preferred embodiments of the invention proceeds, the features, arrangements and combination being clearly pointed out in the specification and in the claims thereunto appended.

According to the invention, the leak-detecting device comprises an element of electrically conductive plastic material such, for example, as conductive rubber that is sensitive to the fluid whose leakage is to be detected and whose conductive characteristics are substantially changed when any fluid contacts the element. The element, which may be of any desired shape, is positioned at one of the probable points of leakage around the container so that any leaking fluid will contact the element substantially immediately after the leakage occurs.

Electrical potential is then passed through the element either continuously or only at the time of checking for any leakage and the resistance of the leak-detecting device to the potential passing through the device is appreciably affected by contact with the fluid. The change in resistance may then be used to indicate that leakage is taking place. Many different forms of indicating means may be used in the electric circuit to determine that the fuel is leaking or not leaking at the location of the leak-detecting device.

The leak-detecting device requires relatively low current and no contact points so that no sparking will take place, thereby minimizing the danger of an explosion. This is particularly important when inflammable or explosive fluids are being carried in the container in confined quarters.

Figure 1:
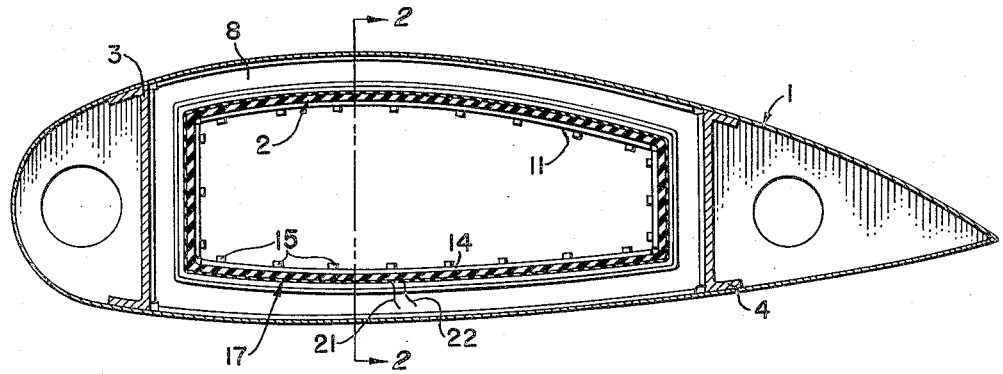
Fig. 1 is a sectional end view of one application of the invention.
Figure 2:
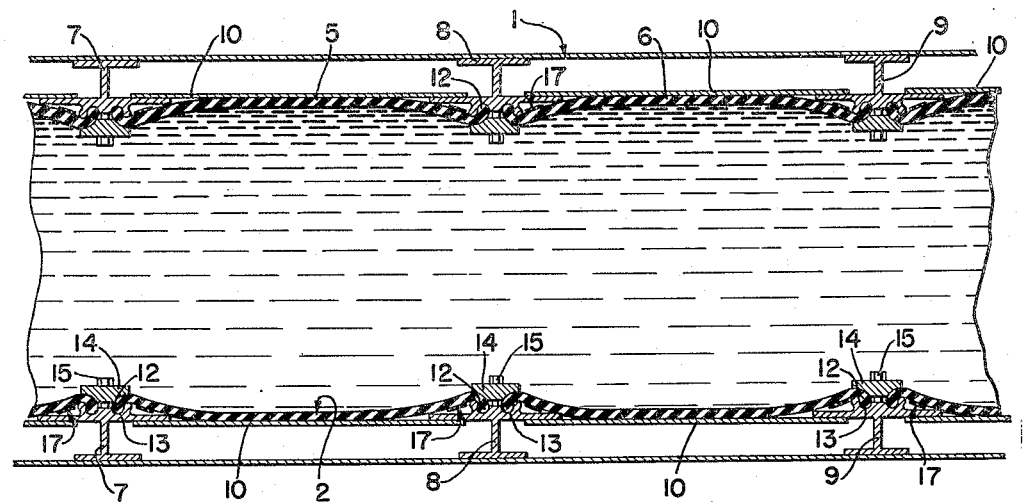
Fig. 2 is a section taken along 2—2 of Fig. 1.

In Figs. 1 and 2, one typical application of the invention is illustrated in which an airplane wing 1 carries a fuel cell 2 within the cavity of the wing 1 between the spars 3 and 4. The cell 2 is formed longitudinally of the wing from a group of individual open-end cell segments, such for example as segments 5 and 6 which are clamped together in an end-to-end relationship to form one continuous cell. The end segments (not shown) have a wall structure closing the outward ends of those segments.

The cell segments 5 and 6 are located in bulkhead cavity formed in the wing 1 between the ribs 7, 8 and 9 and the backing board 10 attached to the ribs. The bulkhead cavity supports the fuel cell 2 and thus prevents the weight of the fluid from distorting the cell segments. The ribs 7, 8 and 9 as shown, are of the usual construction with an opening 11 in the center with the outer periphery forming the support for the wing skin and the fuel cell segments. The fuel cell 2 is carried interiorly of the wing structure through the openings 11 of the rib structure.

Figures 4, 5:
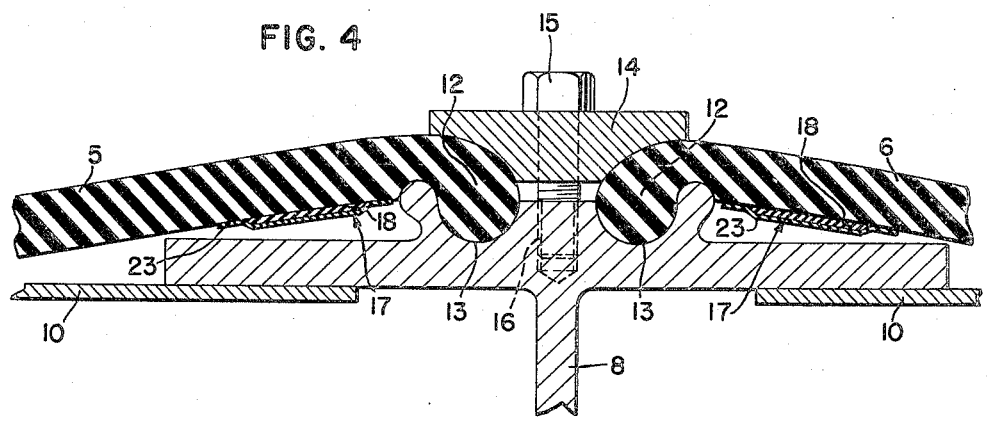
Fig. 4 is an enlarged section of a portion of Fig. 2.
Fig. 5 is a typical wiring diagram of the invention.

One particular means by which the cell segments 5 and 6 may be clamped together is illustrated in Fig. 4. Each end of the cell segment has a bead portion 12 formed around its periphery which is adapted to engage the groove 13 formed interiorly on the ribs 7, 8 and 9. A clamping ring 14, formed to fit the contour of the bead portion of the adjacent cell segments, is then placed in position over the bead portions 12 of segments 5 and 6 and, for example, may be held in position by means of a series of cap screws 15 spaced at intervals across the ring 14. The cap screws 15 engage the threaded apertures 16 in the ribs and draw the ring 14 against the bead portions to hold the fuel cell segments in position and provide a joint which normally prevents leakage of the fluid through the joint.

Figure 3:
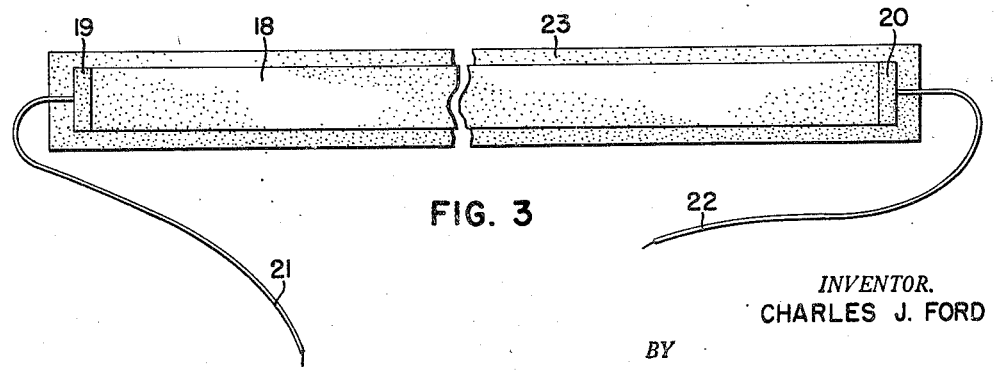
Fig. 3 represents a typical leak-detecting element.

Due to the inaccessibility of such joints for inspection for leakage, it is desirable to provide a leak-detecting device that will indicate at a convenient point, any leakage that is occurring. The leak-detecting device 17 is placed adjacent the bead portion of the segment on the outside wall of the fuel-cell segment. The device 17 preferably is of such length so as to extend around substantially the entire periphery of the cell segment and is held in intimate contact with the cell wall at all times by attaching to the cell wall by means of an adhesive. The leak-detecting device 17 comprises a strip 18 (Fig. 3) of conductive plastic material of the desired length, such, for example, as rubber having acetylene carbon black dispersed therethrough, although any material whose conductivity is affected by contact with the fluid may be used. By varying the proportions of the compounding materials, the sensitiveness of the material to the fluid may be varied but advantageously, the selected material should have a high sensitiveness to the fluid in order that small leaks or vapor will markedly affect the resistance of the material. Electrodes 19 and 20 are incorporated at the opposite ends of said strip so as to extend substantially the entire width of the strip and may be integrally connected to the conductive strip 18 by folding the end of the conductive strip around the electrode. Wires 21 and 22 are attached to the electrodes 19 and 20 respectively which in turn are connected to a source (not shown) of electric energy to cause a difference of potential to be maintained across the conductive strip. A layer 23 of electrically insulating material may be attached to the conductive strip 19 to insulate the conductive strip 18 from other portions of the wing structure and thereby prevent short circuiting of the device and with the result that erroneous results are eliminated.

In one form of the invention the leak-detecting device 17 is placed adjacent each bead portion of each segment in such a manner as to allow the wires 21 and 22 to extend from the device on the bottom side of the wing although the device may be positioned to allow the wires to extend at the most convenient place.

A group of leak-detecting devices 17 may be connected on a circuit so that each device may be checked at a common point. Fig. 5 represents schematically one circuit may be used in which each device 17 is connected to a common wire 24 which in turn is connected to one post 25 of a terminal block 26, the other wires of each device being connected to different posts 27, 28, 29, 30, 31 and 32 of the terminal block 26. The terminal block 26 may be located at any convenient access point in the wing structure or any convenient location in the plane, for example, in the pilot's quarters.

In order to determine if any leakage is taking place, it is only necessary to provide a source 33 of direct current, for example, a storage battery and an indicating means such as a milliammeter 34. One side of the battery is connected to the common line post of the terminal block and the other side of the battery is connected to one side of the indicating device, the milliammeter 34. The other side of the milliammeter 34 then can be connected to one of the other posts of the terminal block in order to determine the current passing through the particular leak-detecting device which is connected to that post, each terminal post preferably being identified as to the location of the leak-detecting device.

The original reading on the indicating means is determined at the time of installation of the cell in the plane. The resistance characteristics of the conductive element are very markedly affected when the fuel, such as gasoline, comes in contact with the conductive rubber. The resistance is greatly increased upon contact with the fuel and as a result the reading on the indicating means would also be changed. If the reading for any of the leak-detecting devices discloses this change, it is then known positively that that particular joint is leaking. After the leakage is corrected and the fluid is evaporated from the device, the normal reading on the indicating means is again obtained so that it is not necessary to replace the indicating means.

Although only one typical installation of the invention is illustrated, it is readily apparent that many types of installations may be made that advantageously use the invention. While the device has been particularly described as applicable to the detection of gasoline leakage, it may also be employed to detect the leakage of other fluids. For example, it may be used to detect leakage of water and various other liquids by selecting a suitable conductive material sensitive to the liquid whose leakage is to be detected to change the electrical resistance of the strip. The change of resistance is indicative of the particular fluid contacting the strip, thus indicating that the container is leaking.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A device for detecting leakage of inflammable or explosive fluids and the like confined in containers having joints where such leakage may occur, said device comprising a sensing element of electrically conductive rubber having an initial resistance positioned adjacent at least a portion of one joint so constructed and arranged that it will be contacted by any fluid leaking through said joint to increase the resistance of said element, a source of electrical potential connected to said sensing element so that said electrical potential passes through said sensing element, and means connected to said source of potential capable of indicating any change in said flow of electrical potential.

2. A device for detecting leakage of inflammable or explosive fluids and the like confined in containers having joints where such leakage may occur, said device comprising a sensing element of electrically conductive rubber having an initial resistance positioned adjacent each joint so constructed and arranged that it will be contacted by any fluid leaking through the joint to increase the resistance of said element, a source of electrical potential connected to each of said sensing elements so that said electrical potential passes through each of said sensing elements, and means connected to said source of potential capable of indicating any change in said flow of electrical potential through said sensing elements.

3. Means for detecting leakage of inflammable or explosive fluids and the like confined in containers having joints where each leakage may occur, including a source of electrical energy, indicating means and a sensing element positioned adjacent at least a portion of one joint and so constructed and arranged that it will be contacted by any fluid leaking through said joint, said sensing element comprising a layer of electrically conductive plastic material having an initial resistance which is increased upon contact by the fluid so that an increase in the resistance of said conductive material when a difference of potential is maintained across the conductive material indicates that a leakage is occurring.

4. Means for detecting leakage of inflammable or explosive fluids and the like confined in containers having joints where such leakage may occur, including a source of electrical energy, indicating means and a sensing element positioned adjacent at least a portion of one joint and so constructed and arranged that it will be contacted by any fluid leaking through said joint, said sensing element comprising a layer of electrically insulating plastic material and a layer of electrically conductive plastic material, said electrically conductive material having an initial resistance which is increased upon contact by the fluid so that an increase in the resistance of said conductive material when a difference of potential is maintained across the conductive material indicates that a leakage is occurring.

5. In the combination of a container for confining explosive or inflammable fluids and a leak detector positioned adjacent a portion of the container where the detector will be contacted by at least a portion of any fluid leaking from the container, an improved leak detector including a source of electrical energy, indicating means, and a sensing element, said sensing element comprising a layer of electrically conductive plastic material having an initial resistance which is increased upon contact by the fluid so that an increase in the resistance of said conductive material when a difference of potential is maintained across the conductive material indicates that a leak is occurring, the initial resistance of said conductive material being restored when the fluid is removed from the conductive material.

References Cited in the file of this patent

UNITED STATES PATENTS

| Number | Name | Date |
| --- | --- | --- |
| 1,557,981 | Otto | Mar. 23, 1926 |
| 1,772,232 | Van Guilder | Aug. 5, 1930 |
| 2,064,651 | Fiene | Dec. 15, 1936 |
| 2,432,367 | Andresen | Dec. 9, 1947 |
| 2,604,785 | Woestemeyer | July 29, 1952 |